(No Model.) 2 Sheets—Sheet 1.
J. M. BREWER.
CULTIVATOR.
No. 465,237. Patented Dec. 15, 1891.
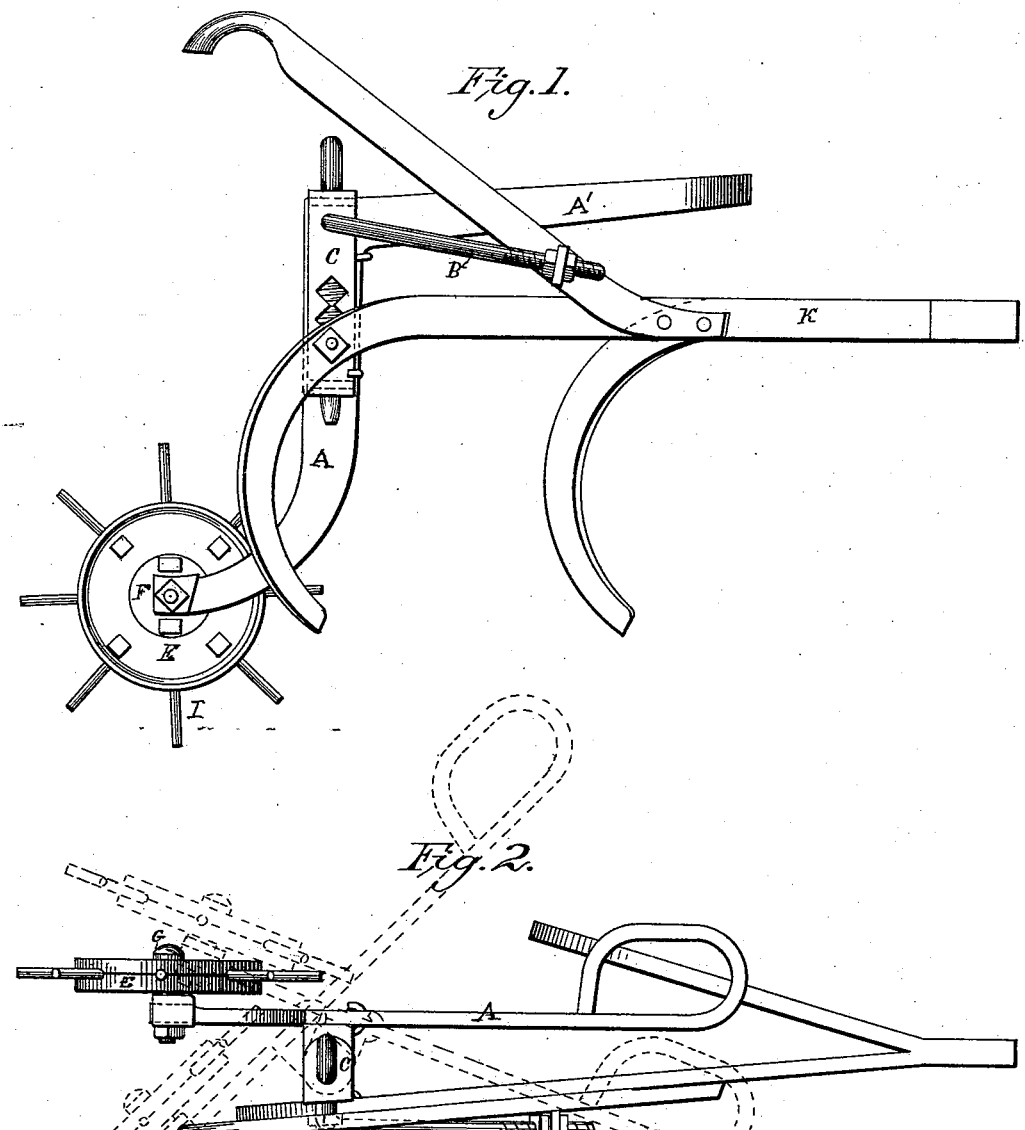
Witnesses:
Beverly T. Pace
William H. Ward
Inventor:
John Marian Brewer (No Model.) 2 Sheets—Sheet 2.
J. M. BREWER.
CULTIVATOR.
No. 465,237. Patented Dec. 15, 1891.
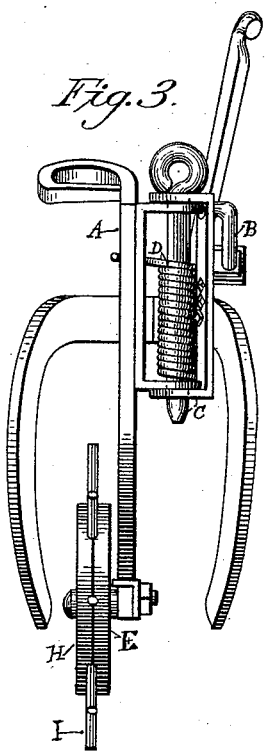
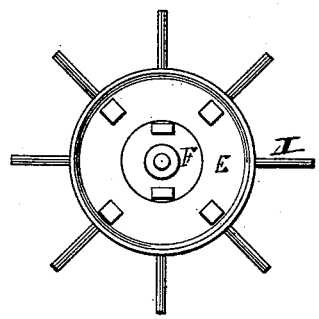
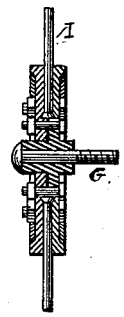
Witnesses:
Beverly T. Pace
William H. Ward
Inventor:
John. Marian Brewer.

United States Patent Office.

JOHN MARIAN BREWER, OF SALEM, INDIANA.

CULTIVATOR.

SPECIFICATION forming part of Letters Patent No. 465,237, dated December 15, 1891.

Application filed April 24, 1889. Serial No. 308,446. (No model.)

*To all whom it may concern:*

Be it known that I, JOHN MARIAN BREWER, a citizen of the United States, residing at Salem, in the county of Washington and State of Indiana, have invented a new and useful Gaging and Guiding Attachment for a Two-Horse Riding-Cultivator, of which the following is a specification.

The objects of my improvement are, first, to regulate the depth of cultivator-plows; second, to easily control said plows with the feet, and, third, to keep the plows close to the corn. I attain these objects by the mechanism illustrated in the accompanying drawings, in which—

Figure 1 is a side view of the entire attachment. Fig. 2 is a plan view showing the movements of the attachments in dotted lines. Fig. 3 is a rear view of the attachment. Figs. 4 and 5 are side and sectional views of the spur-wheel.

The letter K represents the plow-beam. The depth of the plow is regulated by lowering or raising the bolt in the notched slot in hinge C, the said hinge connecting the plow and standard A or foot-lever A'. The foot-lever A' is supported by the standard A of the spur-wheel E, and held in position and also adjusted by rod B.

The cultivator-plows are controlled by the foot-lever A'. The action of the foot is in harmony with spur-wheel E, said wheel having spikes or spurs engaging in the ground to keep said wheel from slipping sidewise, and it may rotate as shown in dotted lines in Fig. 2.

The plow may run close to the row with ease by having hinge C on one side of lever A' and spur-wheel E on the other, which causes said wheel to incline to the row. The turning of the wheel-shank is assisted by spring D in hinge C, as shown in Fig. 3.

The spur-wheel E is made of two thin wheels E and H, bolted together, having grooves on the inside to receive the spikes or spurs I, as shown in Fig. 3. The spurs have a small head on the inner end to make them secure, as shown in Fig. 5.

Hub F in Fig. 4 is secured by two bolts.

The axle G (shown in Fig. 5) passes through the lever or wheel shank and is secured by a nut.

What I claim as my invention, and desire to secure by Letters Patent, is—

1. An attachment for the drag-bars of plows, consisting of the shank or hanger A, having foot-lever A', the wheel E, provided with the spurs I, the hinge C, and the spring D, substantially as described.

2. The hanger A, having a foot-lever extending horizontally forward therefrom, the wheel E, composed of two disks with projecting spurs clamped between the hinge C, attaching said hanger and wheel to the drag-bars in vertical adjustment, the spring D, and adjusting-rod B, substantially as shown and described.

3. The combination, with a cultivator drag-bar, of the horizontally-rotating attachment A A', the spur-wheel E, the adjustable hinge C, spring D, and the adjusting-rod B, substantially as shown and described.

JOHN MARIAN BREWER.

Attest:
BEVERLY T. PACE,
WILLIAM H. WARD.